Patented July 31, 1928.

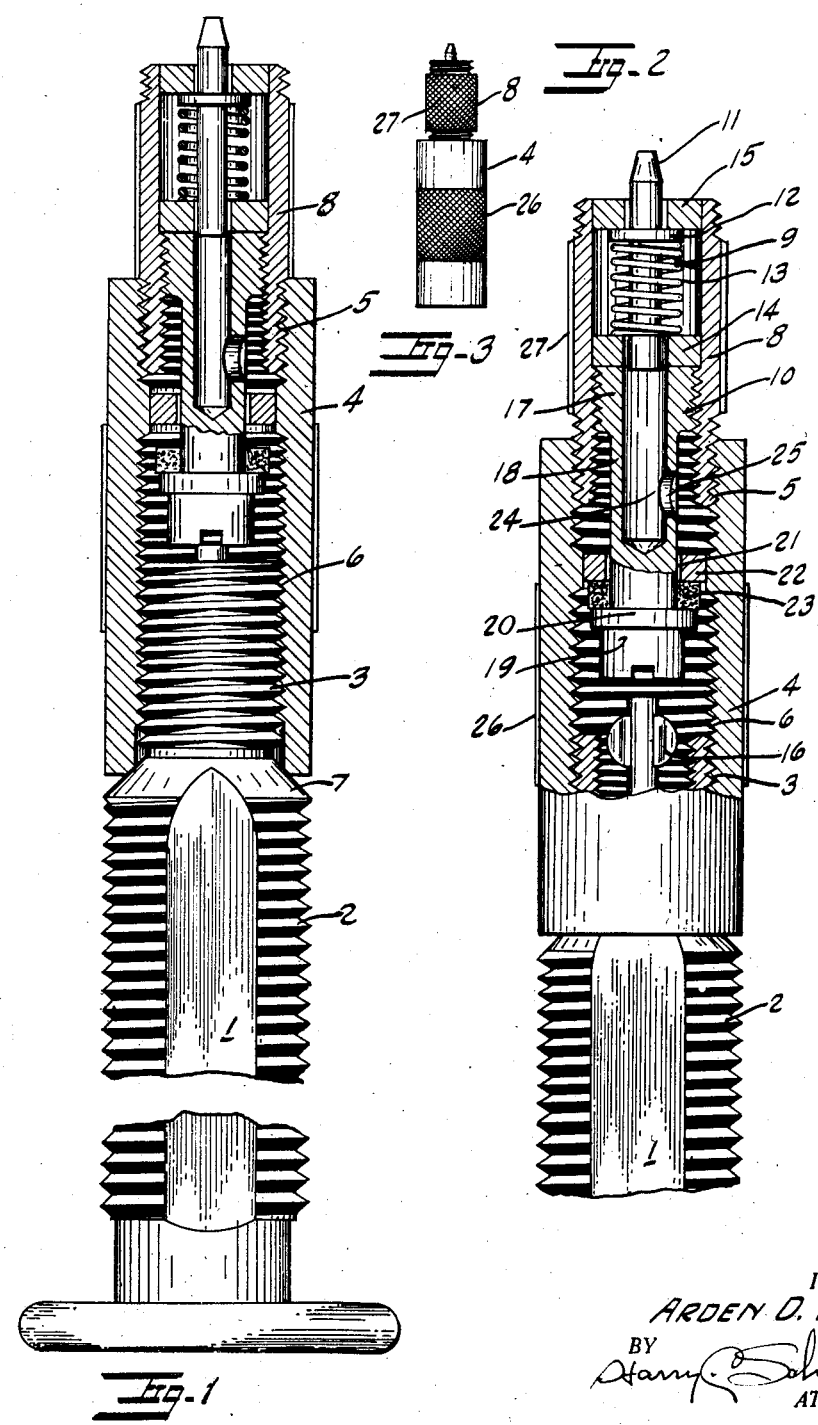

1,678,837

UNITED STATES PATENT OFFICE.

ARDEN D. WHIPPLE, OF OAKLAND, CALIFORNIA.

VALVE CAP.

Application filed May 16, 1927. Serial No. 191,736.

This invention relates to an improvement in caps adapted to be placed upon the usual type of pneumatic tire valve.

The object of the invention is to provide a cap having a secondary sealing means which functions to control the inlet and exhaust of the air from the tire without being removed from the tire valve to which it is applied.

A further object is to provide an improved valve cap which is thoroughly dust-proof and air-tight and which may be readily attached to any standard valve stem such as now commonly employed.

A preferred form of the embodiment of the invention is shown in the accompanying drawings and described in the specification and appended claims, but it is to be understood that changes may be made within the scope of the claims without departing from the spirit of the invention.

In the accompanying drawings,

Fig. 1 shows a vertical view in which the usual tire valve stem is shown in elevation while the valve cap is shown in vertical section as applied thereto, Fig. 2 shows a vertical sectional view of the valve cap and occupying a different position on the valve stem, and Fig. 3 shows an elevation of the invention.

Referring more specifically to the drawings in which similar reference numerals are used to denote similar parts in the several views, the reference numeral 1 indicates the usual type of pneumatic tire valve having a lower threaded portion 2 adapted to serve as a means for engagement for the usual dust cap, and a reduced upper threaded portion 3 which ordinarily serves as a means for engagement for the usual type of valve cap which this invention is designed to replace. The reference character 4 indicates a cap sleeve which is interiorly threaded for portions of its length from each end as at 5 and 6. The inner end of sleeve 4 is adapted to be placed in abutting relation with the conical shoulder 7 separating the threaded portions 2 and 3 of the valve stem, thus forming an additional air sealing means, since any small portion of air escaping from the tire through the tire valve and finding its way past the threaded connection between the tire valve and the sleeve will be held by the tight joint made between the edge of the sleeve and the shoulder upon which it rests. It will thus be seen that the inner threads 6 formed on the interior of the sleeve are for the purpose of engagement with the usual threads 3 formed upon the stem of the tire valve. The threads 5 formed on the opposite end of the sleeve are adapted to serve as an engaging means for a cylindrical housing 8. The cylindrical housing is adapted to contain a valve mechanism 9 and to have attached to it a valve controlling member 10. The valve mechanism 9 consists of a valve stem 11 to which is fixed a disklike valve body 12 normally held in closed position by a coil spring 13 under compression between the valve body 12 and a disk 14 which is fixed into the housing 8. The valve 12 seats against a disk 15 fitted into the outer end of the cylindrical housing 8 to effectively close the same. The disks 14 and 15 have aligned central apertures through which the valve stem 11 is adapted to project. Abutting against the lower side of the disk 14 and connected to the cylindrical housing 8 by a threaded connection is the valve controlling member 10. This valve controlling member is adapted to be raised and lowered and then brought into engagement or disengagement with the plunger 16 of the main valve 1. Downward pressure put upon the plunger 16 will unseat the valve and permit entrance to or escape of air from the tire. The valve controlling member consists of an enlarged upper portion 17 which is exteriorly threaded to engage interior threads in the housing member 8, a reduced central shank 18, and a lower enlarged head 19 adapted to engage the plunger 16 of the main valve. Upon the upper face of the head 19 is fixed a disk-like valve body 20 adapted to close an opening 21 in a disk valve seat 22, the latter being fixed in the sleeve 4 between the upper and lower threaded portions thereof. A compressible packing ring 23 is shown as cooperating with the valve 20 and the valve seat 22 to form a more effective seal therebetween. The controlling member 10 is provided along a portion of its length with a central bore or passageway 24, and an opening 25 establishes communication between the central bore and the outside of the chamber.

In the normal operation of the invention, the controlling member 10 and the main valve plunger 16 will be disengaged, and the main valve will be closed as usual. Any tendency of the main valve to leak will be checked, owing to the fact that the cap is substantially air-tight when the lower end thereof is tight against the conical shoulder 7 and the openings in the valve seats 15 and 22 are closed by the disks 12 and 20 respectively. When the housing 8 is threaded farther into the sleeve 4 the valve controlling member 10 is moved downwardly into the sleeve 4 and eventually engages the plunger 16 of the tire valve. The tire valve will then be unseated and air will escape from the tire through the valve into the chamber formed in the sleeve, passing through the opening 21 in the valve seat 22, into the central bore 24 by the opening 25 and from thence into the chamber formed between the disks 14 and 15 in the housing 8. The passageway of the air here is closed by the valve 12 seated against the end disk 15 and escape of the air is prevented thereby. Entrance or escape of the air is therefore controlled by the valve stem 11 which may be manually depressed for escape of the air or will be depressed by the central boss found in the attaching end of the usual inflating apparatus. In order to facilitate the adjustment of the respective parts, the sleeve 4 and the housing 8 may be knurled on their outer surface as at 26 and 27.

If desired, a protecting member may be used for the valve stem 9 for which purpose exterior threads are provided on the upper end of the housing 8. This member may be the usual form of valve cap. The entire device is of such size that a dust cap may be placed over the entire invention and attached by the usual threads provided for it upon the tire valve. This triple sealing however is optional and has nothing to do with the present invention.

Having thus described my invention, what I claim is:

1. A pneumatic valve cap comprising a sleeve having means for attachment to the usual pneumatic tire valve stem, valve housing threadedly engaging said sleeve, an auxiliary valve within said housing, a valve controlling member connected to said housing and adapted to be advanced therewith by the threading of said housing into the sleeve so as to unseat the usual pneumatic tire valve.

2. A pneumatic valve cap comprising a sleeve interiorly threaded adjacent the ends, a cylindrical valve housing interiorly and exteriorly threaded for a portion of its length adjacent one end thereof, two apertured disks fixed within said housing, a valve for closing the aperture in one of said disks comprising a stem, a valve body upon said stem, a coil spring placed about said stem to urge the valve body against the disk, and a valve controlling member attached to said housing and adapted to be advanced therewith by the turning of the housing in the sleeve so as to unseat the usual pneumatic tire valve.

3. A pneumatic valve cap comprising a sleeve interiorly threaded adjacent the ends, a cylindrical valve housing interiorly and exteriorly threaded for a portion if its length adjacent one end thereof, two disks having a central aperture fixed within said housing, a valve for closing the aperture in one of said disks comprising a stem, a disk-like valve body upon said stem, and a coil spring placed about said stem to urge the body into valve closing position, and a main valve controlling member, said valve controlling member comprising a stem attached to said housing, a disk-like valve body attached to said stem, said valve seating upon a disk-like valve seat having an aperture to permit passage of the stem.

4. A pneumatic valve cap comprising a main hollow cylindrical sleeve interiorly threaded on different diameters for portions of its length, the threads upon the larger diameter being adapted to engage the threads upon the usual valve applied to a pneumatic tire, a hollow cylindrical housing having exterior threads adapted to co-operate with the threads upon the smaller diameter of said main sleeve, and being interiorly threaded for a portion of its length, a pair of disks having central apertures fitted into said cylindrical housing in spaced relation, a valve comprising a stem and disk-like body portion, said stem being concentrically located within said disk apertures, a coil spring for maintaining said disk-like valve portion in closed position, a valve controlling member comprising a cylindrical member having an enlarged threaded portion at one end adapted to engage the threads upon the smaller diameter of the cylindrical housing, an enlarged head on the opposite end of the member, a valve seat through which the controlling member extends, a disk valve on the head of the controlling member adapted to cooperate with the valve seat, said controlling member having a centrally located passageway, and an aperture leading thereinto from the interior of said housing.

In testimony whereof I affix my signature.

ARDEN D. WHIPPLE.